(12) United States Patent
Yamaguchi

(10) Patent No.: US 9,235,111 B2
(45) Date of Patent: Jan. 12, 2016

(54) PROJECTION DISPLAY APPARATUS

(71) Applicant: CANON KABUSHIKI KAISHA, Tokyo (JP)

(72) Inventor: Yutaka Yamaguchi, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 286 days.

(21) Appl. No.: 14/039,565

(22) Filed: Sep. 27, 2013

(65) Prior Publication Data
US 2014/0092320 A1 Apr. 3, 2014

(30) Foreign Application Priority Data

Oct. 1, 2012 (JP) ................................. 2012-219185

(51) Int. Cl.
*G03B 21/20* (2006.01)
*G02F 1/1335* (2006.01)
*G03B 33/12* (2006.01)
*H04N 9/31* (2006.01)

(52) U.S. Cl.
CPC ...... *G03B 21/2073* (2013.01); *G02F 1/133528* (2013.01); *G03B 33/12* (2013.01); *H04N 9/3167* (2013.01)

(58) Field of Classification Search
None
See application file for complete search history.

(56) References Cited

U.S. PATENT DOCUMENTS 8,149,360 B2 4/2012 Yamaguchi
2013/0100376 A1* 4/2013 Sawado ............ G02F 1/133632
349/61

FOREIGN PATENT DOCUMENTS

JP 2011-033762 A 2/2011

* cited by examiner

*Primary Examiner* — Richard Kim
(74) *Attorney, Agent, or Firm* — Rossi, Kimms & McDowell LLP

(57) ABSTRACT

A projection display apparatus includes a polarization beam splitter, a first phase compensation plate including two layers, and a light modulator. Each layer has a constant axial angle, and an optical axis of each layer inclines with respect to the x axis in an xz plane. The axial angle of the layer closer to the polarization beam splitter among the two layers is larger than the axial angle of the layer farther from the polarization beam splitter. $20° \leq \theta max - \theta min \leq 80°$ is satisfied where $\theta max$ is a maximum value of the axial angle and $\theta min$ is a minimum value of the axial angle. $40° \leq \theta ave \leq 70°$ is satisfied where $\theta ave$ is an average value of axial angles of the two layers.

20 Claims, 10 Drawing Sheets

PROJECTION DISPLAY APPARATUS

BACKGROUND OF THE INVENTION

1. Field of the Invention

The present invention relates to a projection display apparatus (image display apparatus) such as a liquid crystal projector.

2. Description of the Related Art

Since a polarization characteristic of a polarization beam splitter or a phase compensation plate (phase difference plate) of a projection display apparatus have incident angle dependency, polarized light in the entire incident angle range cannot be uniformly split, but the light partially becomes leaked light. In addition, since normally reflected light ($0^{th}$ order reflected light) and other order diffracted light beams which are generated through reflection of incident light on an image display element (image modulator) are reflected at different angles, the incident light is differently influenced by polarization elements, so that light leakage occurs. Due to the light leakage, a problem occurs in that the contrast of a projection image is deteriorated.

In order to solve this problem, Japanese Patent Laid-Open No. ("JP") 2011-33762 proposes arranging a phase difference plate having an inclined optical axis between the polarization beam splitter and the image display element. The phase difference plate has different refractive indexes in two orthogonal directions in the optical plane, and a phase difference larger than λ/4 to the polarized light having a designed wavelength λ which vertically enters the optical plane. Assume that a z axis is a normal direction of an incident/emitting plane of the polarization beam splitter, a y axis is a direction perpendicular to the z axis and the normal line of the polarization splitting plane, and an x axis is a direction perpendicular to the z axis and the y axis. Then, the optical axis of the phase difference plate is located on the xz plane and inclines with respect to the x axis. By appropriately setting the angle of the optical axis, the asymmetry generated by the polarization beam splitter can be compensated (cancelled).

JP 2011-33762 uses the uniaxial dielectric crystal such as sapphire or quartz for the phase difference plate, but the uniaxial dielectric crystal is hard to process or handle and has a high sensitivity to the axial angle and a low contrast stability. In other words, when the angle of the optical axis shifts from the designed angle due to the manufacturing error and the installation error, the contrast of the projection image is greatly deteriorated and the contrast cannot be stably improved.

SUMMARY OF THE INVENTION

The present invention provides a projection display apparatus configured to stably improve the contrast of the projected image.

A projection display apparatus according to the present invention is configured to project an image onto a target surface. The projection display apparatus includes a polarization beam splitter having a polarization splitting plane configured to transmit first polarized light of incident light and to reflect second polarized light of the incident light which has a polarization direction perpendicular to that of the first polarized light, a first phase compensation plate including two layers and configured to provide a retardance which is larger than a sum of λ/4 to polarized light having a wavelength λ from the polarization beam splitter, and a light modulator configured to modulate light from the first phase compensation plate according to an image signal. When a z axis is set to a normal direction of an incident plane of the light modulator, a y axis is set to a direction perpendicular to the z axis and a normal of the polarization splitting plane, an x axis is set to a direction perpendicular to the z axis and the y axis, and an axial angle is defined as an angle of 90° or less between each of optical axis of two layers of the first phase compensation plates and the z axis, and the optical axis of each layer inclines with respect to the x axis in an xz plane. The axial angle of the layer closer to the polarization beam splitter among the two layers is larger than the axial angle of the layer farther from the polarization beam splitter. $20° \leq \theta max - \theta min \leq 80°$ is satisfied where $\theta max$ is a maximum value of the axial angle and $\theta min$ is a minimum value of the axial angle. $40° \leq \theta ave \leq 70°$ is satisfied where $\theta ave$ is an average value of axial angles of the two layers.

Further features of the present invention will become apparent from the following description of exemplary embodiments with reference to the attached drawings.

DESCRIPTION OF THE EMBODIMENTS

Figure 1:
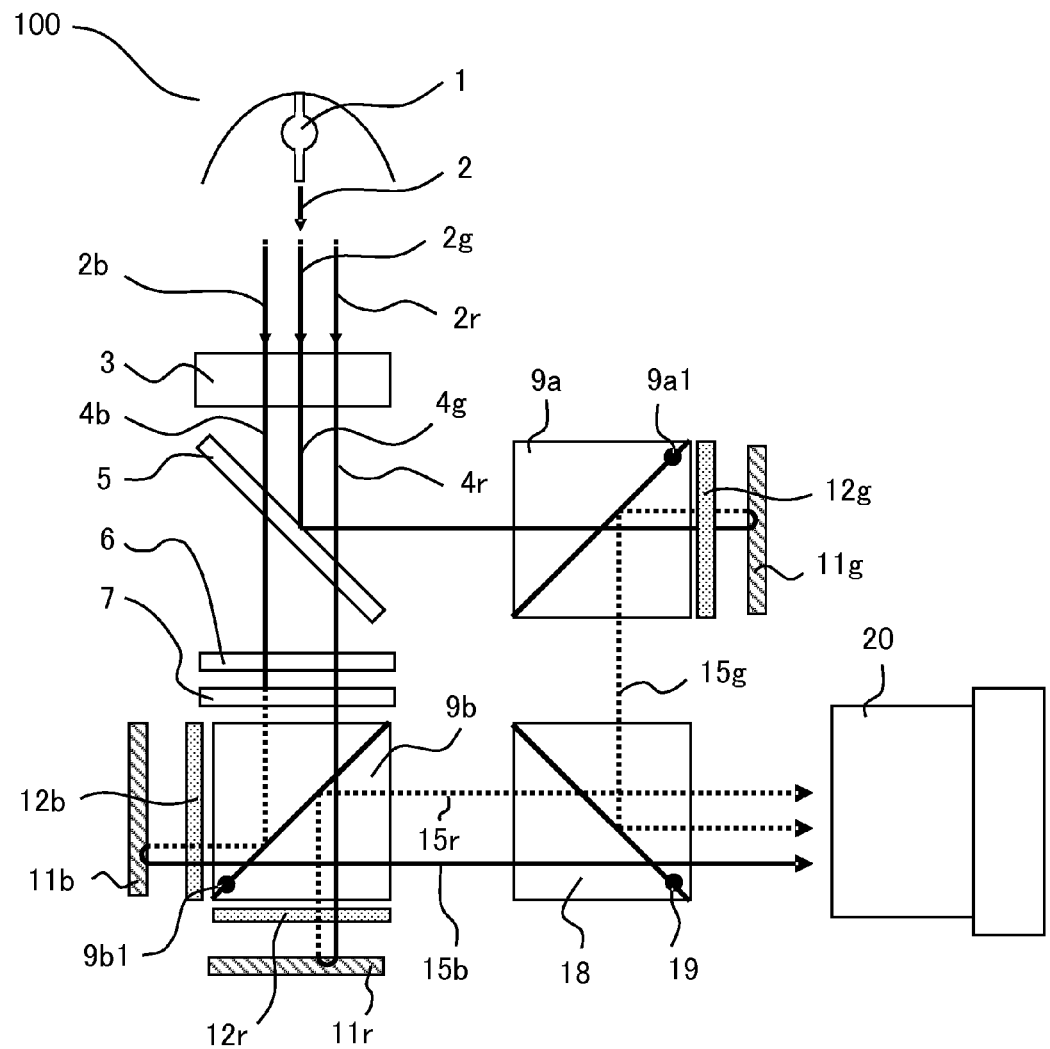
FIG. 1 is a block diagram illustrating a projection display apparatus according to this embodiment.

FIG. 1 is a block diagram illustrating a projection display apparatus (image display apparatus) 100 according to this embodiment. The projection display apparatus 100 is, for example, a liquid crystal projector, and configured to project an image onto a target surface. The projection display apparatus includes a light source 1, a polarization converter 3, a dichroic mirror 5, a polarizer 6, a color selective phase difference plate 7, polarization beam splitters 9a and 9b, image display elements 11g, 11b, and 11r, phase compensation plates 12g, 12b, and 12r, a combining prism 18, and a projection optical system 20.

The light source 1 of this embodiment is a white lamp equipped with a reflector, but the light source 1 is not limited to a lamp and may use a laser, an LED, or the like. Reference numeral 2 denotes a white colored parallel light flux emitted from the light source 1, and reference numerals 2g, 2b, and 2r denote green colored light, blue colored light, and red colored light, respectively. In addition, actually, in this stage, the three light beams are not spatially split from each other.

Each colored light emitted from the light source contains various types of polarized light fluxes. Each colored light transmits through the polarization converter 3, is aligned in a uniform polarization direction, and enters the dichroic mirror 5. For example, the polarization converter 3 aligns polarization directions of a light flux from the light source 1 with the p-polarized light. Reference numerals 4g, 4b, and 4r denote polarization-converted green colored light, polarization-converted blue colored light, and polarization-converted red colored light, respectively.

The dichroic mirror 5 has a characteristic of splitting the colored light beams by transmitting the colored light 4b in a blue wavelength band (B) and the colored light 4r in a red wavelength band (R) and by reflecting the colored light 4g in a green wavelength band (G). As a result, the G colored light (G polarized light) enters the polarization beam splitter 9a, and the B colored light (B polarized light) and the R colored light (R polarized light) enter the polarizer 6.

The polarizer 6 transmits, for example, the p-polarized light (first polarized light) and reflects the s-polarized light (second polarized light different from or perpendicular to the first polarized light), thereby improving a degree of polarization of the B colored light and the R colored light. The color selective phase difference plate 7 changes the polarization direction of the B colored light by 90° (for example, converts p-polarized light into s-polarized light) and maintains the polarization direction of the R colored light.

The polarization converter 9a is a polarized beam splitter ("PBS") for green, and the polarization converter 9b is a PBS for blue and red. The polarization beam splitters 9a and 9b enter angle dependency. For example, each of the polarization beam splitters 9a and 9b is a McNeil type polarization beam splitter configured to transmit the p-polarized light and to reflects s-polarized light among the polarized light beams incident on the polarization splitting planes 9a1 and 9b1. The element having this function is constructed, for example, by laminating thin films having different refractive indexes on the polarization splitting planes 9a1 and 9b1.

The polarization direction of the light incident on each of the image display elements (light modulators) 11b, 11r, and 11g is changed by 90° for each pixel according to an image signal and is modulated and reflected, so that the light becomes image light.

The G polarized light reflected by the dichroic mirror 5 is, for example, the p-polarized light. Therefore, the G polarized light transmits through the polarization splitting plane 9a1 and the phase compensation plate 12g of the polarization beam splitter 9a, is reflected by the image display element 11g for G, and is converted into the s-polarized light (image light 15g). As a result, the image light 15g is reflected by the polarization splitting plane 9a1, and enters the combining prism 18.

On the other hand, the R polarized light and the B polarized light transmit through the polarizer 6, and the degree of polarization is improved. By using the color selective phase difference plate 7, the B colored light is maintained, for example, as s-polarized light, and the R colored light is maintained, for example, as p-polarized light, and the B polarized light and the R polarized light enter the polarization beam splitter 9b. As a result, the B colored light is reflected by the polarization splitting plane 9b1, and the R colored light transmits the polarization splitting plane 9b1. The B colored light reflected by the polarization splitting plane 9b1 transmits through the phase compensation plate 12b, is reflected by the image display element 11b for B, and is converted into the p-polarized light (image light 15b). As a result, the image light 15b transmits through the polarization splitting plane 9b1. The R colored light transmitting through the polarization splitting plane 9b1 transmits through the phase compensation plate 12r, is reflected by the image display element 11r for R, and is converted into s-polarized light (image light 15r). As a result, the image light 15r is reflected by the polarization splitting plane 9b1. The image light 15b and the image light 15r are combined by the polarization splitting plane 9b1 and enter the combining prism 18.

The dichroic film 19 of the combining prism 18 reflects the image light 15g and transmits the image light 15b and the image light 15r. Therefore, the combining prism 18 combines the image light 15g, the image light 15b, and the image light 15r, and the projection optical system (projection lens) 20 projects color-combined image light (projection image) onto a projection plane such as a screen (not illustrated).

The phase compensation plate 12g is arranged between the polarization beam splitter 9a and the image display element 11g. The phase compensation plate 12b is arranged between the polarization beam splitter 9b and the image display element 11b. The phase compensation plate 12r is arranged between the polarization beam splitter 9b and the image display element 11r.

The phase compensation plates (first phase compensation plates) 12g, 12b, and 12r have functions similar to that of the phase difference plate disclosed in JP 2011-33762, but the robustness against the manufacturing error or installation error has improved. Each of the phase compensation plates 12g, 12b, and 12r includes a plurality of refractive index anisotropic layers in which the inclinations of the optical axes of the plate plane normal are different from each other.

Now assume that a z axis is the normal direction of an incident plane or an exit plane of the image display element (or polarization beam splitter), a y axis is a direction perpendicular to the z axis and the normal line of the polarization splitting plane is defined by the y axis, and an x axis is a direction perpendicular to the z axis and the y axis. In addition, the incident angle of the incident light is defined as an angle with respect to the z axis, and the incident azimuth is defined as an angle with respect to the x axis of a projection image onto the xy plane of the incident direction. Each refractive index anisotropic layer of the phase compensation plate has different refractive indexes in the two orthogonal directions in the optical plane. A retardance (phase difference) which is larger than a sum of $\lambda/4$ is applied to the polarized light having a wavelength $\lambda$ in a working wavelength band, which vertically enters from the polarization beam splitter on the optical plane. The optical axis of each refractive index anisotropic layer of the phase compensation plate inclines with respect to the x axis in the xz plane.

As disclosed in JP 2011-33762, this is because the angular distribution of the polarization state of the light beam just after the incident light enters the polarization beam splitter is symmetric with respect to the x axis but asymmetric with respect to the y axis. When the optical axis inclines relative to the y axis, the polarized light receives a phase difference that is symmetric with respect to the x axis and asymmetric with respect to the y axis. Thus, if the phase difference that occurs in the polarization beam splitters $9a$ and $9b$ and is asymmetric with respect to the y axis and the phase difference that occurs in the phase compensation plates $12g$, $12b$, and $12r$ and is asymmetric with respect to the y axis are complementary to each other, the asymmetry can be compensated or cancelled. In addition, for diffracted light whose incident angle is different between the outward path and the return path, the compensating effect equivalent to that of normally reflected light can be obtained.

A detailed description will now be given of a configuration of the G-optical path. The following description is also applied to each of the R optical path and the B optical path.

Figure 2:
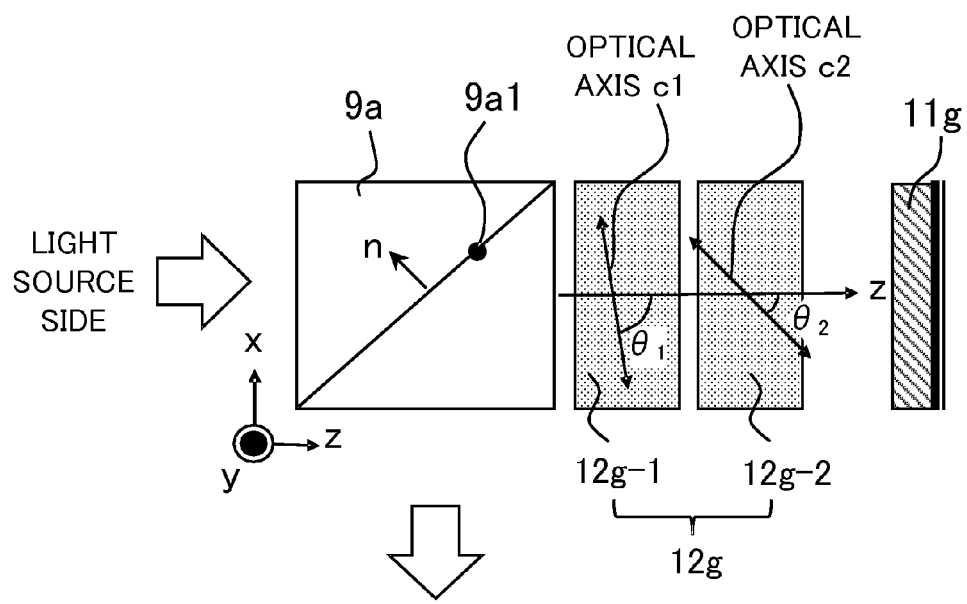
FIG. 2 is a schematically partially enlarged diagram of FIG. 1.

FIG. 2 is an enlarged view around the polarization beam splitter $9a$, the image display element $11g$, and the phase compensation plate $12g$. In this figure, the z axis is a direction parallel to the normal direction of the incident plane of the polarization beam splitter $9a$, a y axis is a direction perpendicular to the z axis and the normal direction n of the polarization splitting plane $9a1$, and an x axis is a direction perpendicular to the z axis and the y axis.

As illustrated in FIG. 2, the phase compensation plate $12g$ includes a plurality of refractive index anisotropic layers $12g$-1 and $12g$-2. It may be considered that the axial angle in each layer is constant.

A phase difference larger than a sum of $\lambda/4$ of two layers is applied to linearly polarized light having a central wavelength $\lambda$ in a green wavelength band which vertically enters the plate plane. The optical axes c1 and c2 of the refractive index anisotropic layers $12g$-1 and $12g$-2 are arranged parallel to the xz plane at an arbitrary depth, and angles $\theta1$ and $\theta2$ (angles of 90° or less, that is, an acute angle or a right angle) between the optical axes c1 and c2, and the z axis direction are different from each other ($\theta1 \neq \theta2$).

The optical axes c1 and c2 are not perpendicular to each other and incline by a predetermined angle with respect to the z axis direction. The "optical axis" is an axis extending in the direction where refractive index anisotropy does not occur with respect to the incident light. In the embodiment, uniaxial refractive index anisotropy is mainly considered. In this case, the "optical axis" has the same meaning as the direction of abnormal light refractive index. The optical axis does not need to be accurately located on the xz plane. By taking into consideration manufacturing errors, arrangement shifts, or the like, the optical axis may be arranged so that the angle between the optical axis and the xz plane can be 5° or less. The optical axis may be arranged so that the angle is 2.5° or less. The phase compensation plate $12g$ including the refractive index anisotropic layers $12g$-1 and $12g$-2 of which the axial angles are arranged in predetermined directions can reduce the angular sensitivity while securing the phase compensation effect.

A description will now be given of effects of this embodiment using a Stokes parameter (S1, S2, S3). The Stokes parameter (S1, S2, S3) can be expressed by amplitudes Ex and Ey of two orthogonal polarized light beams and a phase difference $\delta$ therebetwee as follows (where < > means time averaging).

$S1=<Ex^2>-<Ey^2>$
$S2=2<ExEy \cos \delta>$
$S3=2<ExEy \sin \delta>$

For example, linearly polarized light oscillating in the x axis direction is expressed by (1, 0, 0), linearly polarized light oscillating in the y axis direction is expressed by (−1, 0, 0), and circularly polarized light is expressed by (0, 0, 1) or (0, 0, −1). If a light extinction ratio of the polarizer is an ideal value, the transmission polarization state It of the light beam Ii incident at an incident angle i of 20° and the incident azimuth $\psi$ is 90° on the polarization beam splitter $9a$ illustrated in FIG. 3 which inclines by 45° with respect to the z axis direction becomes (0.18, 0.92, 0). As a result, if the incident angle i is 0°, a shift from the linearly polarized light (1, 0, 0) parallel to the x axis occurs. This shift depends on a magnitude of the incident angle i and the incident azimuth $\psi$, and causes light leakage. Hence, a desired polarization state may be set with the phase compensation plate $12g$. Herein, the configuration is made close to the linearly polarized light (1, 0, 0).

Figure 3:
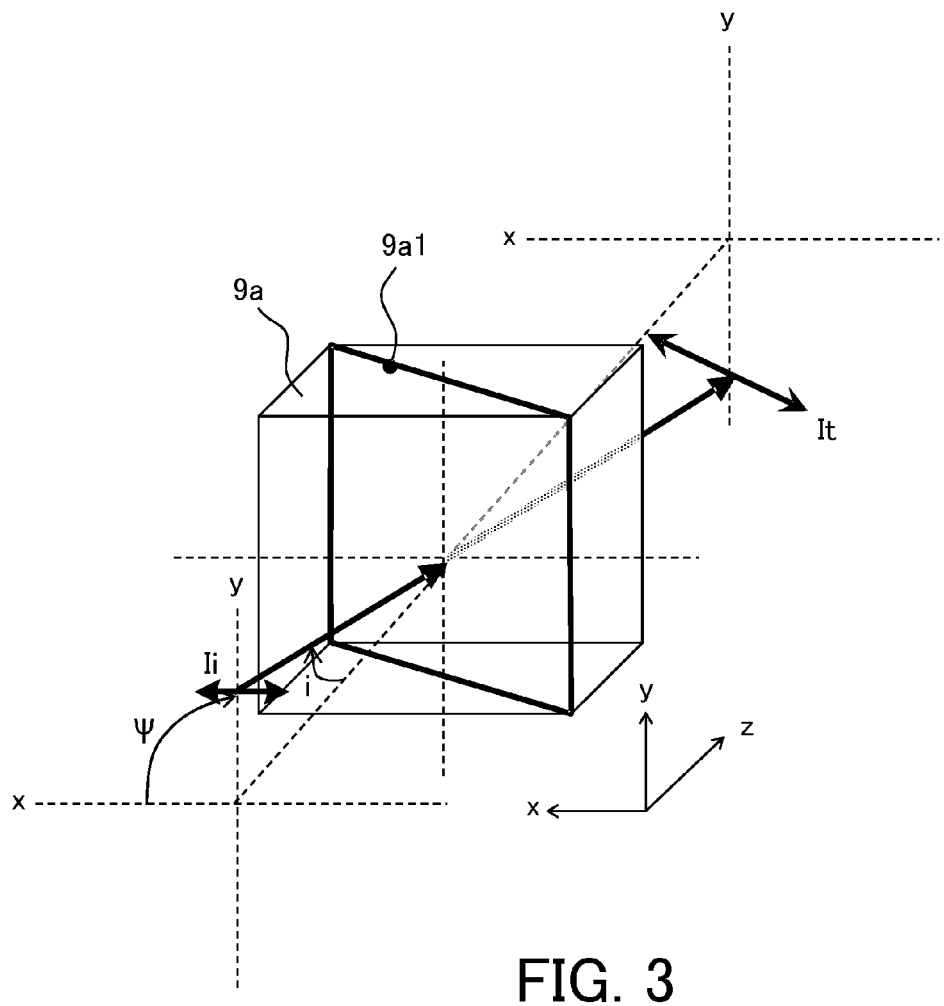
FIG. 3 is a diagram illustrating a relationship between an incident angle and a polarization state.
Figure 4:
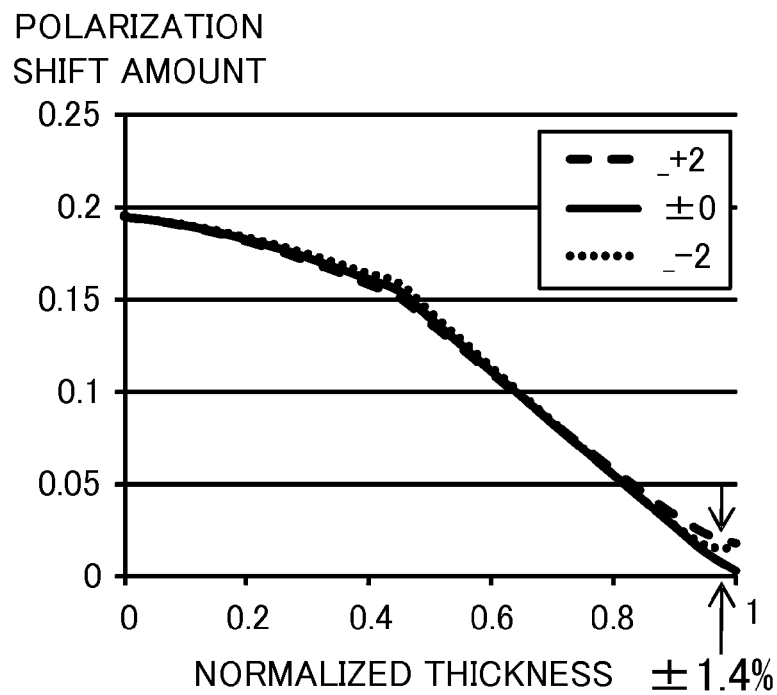
FIG. 4 is a graph illustrating a compensation characteristic in compensating the polarization state illustrated in FIG. 3 using a phase compensation plate illustrated in FIG. 2.

FIG. 4 is a graph illustrating compensation characteristics in the case where the polarization state illustrated in FIG. 3 is compensated by using the phase compensation plate $12g$ illustrated in FIG. 2. In FIG. 4, the vertical axis indicates the polarization shift amount as an absolute value of a difference vector between the stokes parameter (S1, S2, S3) and (1, 0, 0), and the horizontal axis indicates a thickness (normalized) of the phase compensation plate $12g$.

FIG. 4 illustrates a change of the polarization state in the depth direction when the polarized light in the initial state It transmits through the phase compensation plate $12g$. In addition, the dotted line and the broken line indicate the cases where the average value $\theta$ave of the axial angles in the thickness direction is changed by average ±2° from a reference value. FIG. 6 illustrates a compensation characteristic according to a comparative example 1 similar to FIG. 4 when the compensation is performed with the phase compensation plate $12g$ having a single refractive index anisotropic layer illustrated in FIG. 5.

For each optimal value, a compensation for a desired polarization state is obtained but when their shift amounts at the axial angle $\theta$ave ±2° are compared with each other after the transmission through the phase compensation plate of FIGS. 4 and 6 (horizontal axis=1), a change of the polarization shift amount of the two-layered configuration is reduced by 22% in comparison to the shift amount of the single-layered configuration. In particular, in the single-layered configuration, a shift uniformly increases in the depth direction whereas a change thereof is suppressed down in a region of about 80% of the thickness in the two-layered configuration. The shift amount estimated from the Stokes parameter and the angular sensitivity of leakage light are not simply equivalent to each other, but it can be understood that the change sensitivity to the angle in the two-layered configuration is mitigated in comparison with the single-layered configuration.

This is caused by a difference in available parameter to the phase compensation plate between the single-layered configuration and the multi-layered configuration. In the single-layered configuration, the compensation characteristic of the phase compensation plate is determined by a thickness d and an axial angle θ. Among them, since the axial angle θ depends on a magnitude of a change of the polarization axis caused by the polarization beam splitter and the thickness d is determined by a phase difference applied to the transmitting light, the sensitivity cannot be adjusted. On the other hand, this embodiment can adjust the balance of the axial angles θ1 and θ2 for the total thickness d and the axial angles θ1 and θ2 without changing the average value θave of the axial angles. As a result, as illustrated in FIG. 4, a change of the compensation effect according to an angular change is restrained and a high contrast can be maintained.

The compensation effect is differently influenced according to the arrangement of the axial angles. For example, consider a configuration of comparative example 2 illustrated in FIG. 7 which is different from FIG. 2 in terms of the arrangement of optical axes of the two refractive index anisotropic layers. When the refractive index anisotropic layer 12g-1 of the polarization beam splitter side has a layer thickness d1 and an axial angle θ1 and the refractive index anisotropic layer 12g-2 of the image display element side has a layer thickness d2 and an axial angle θ2, the thickness d1 and the thickness d2 are equal to each other but the axial angles are set as θ1>θ2 in FIG. 2 and as θ1<θ2 in FIG. 7. The average value θave of the axial angles is the same but the magnitude relationship of the axial angles in the refractive index anisotropic layers to be arranged are opposite between the image display element side and the polarization beam splitter side.

Figure 6:
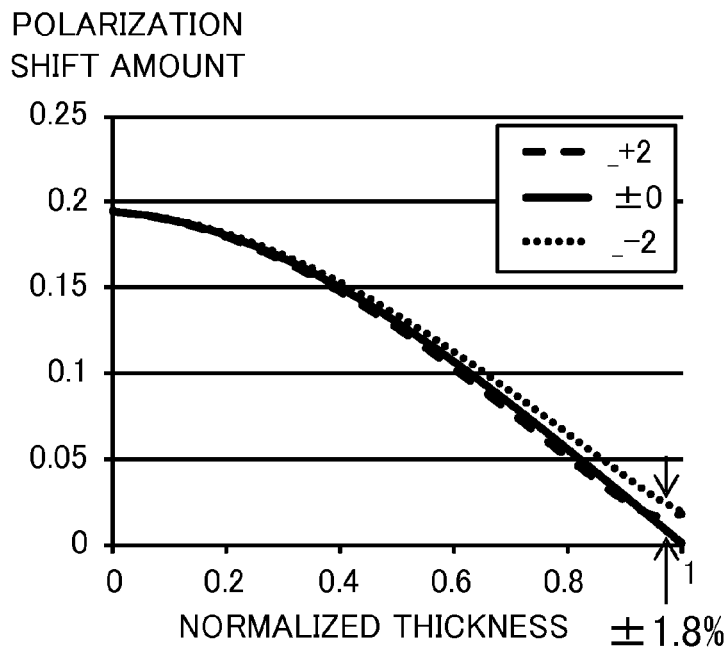
FIG. 6 is a graph corresponding to FIG. 4 in compensating the polarization state using the phase compensation plate illustrated in FIG. 5.
Figure 7:
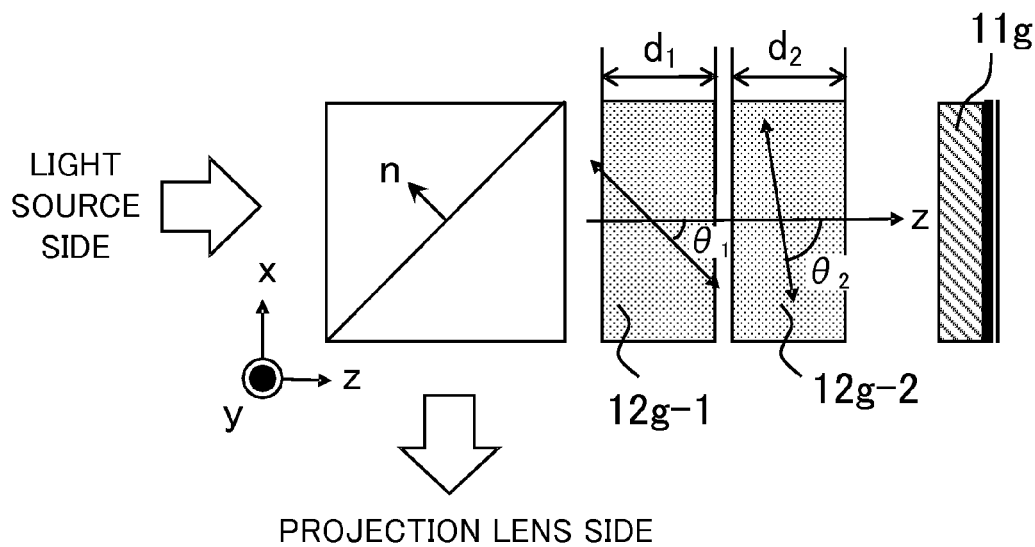
FIG. 7 is a schematic diagram illustrating a configuration according to a comparative example 2 corresponding to FIG. 2 of a phase compensation plate.
Figure 8:
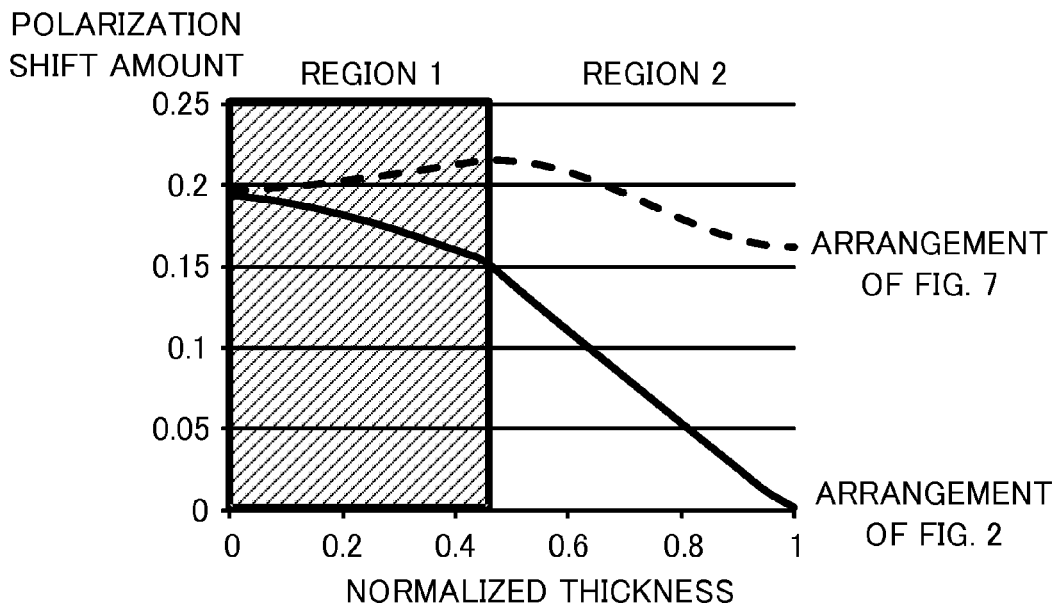
FIG. 8 is a graph that compares an effect of the phase compensation plate illustrated in FIG. 2 with that illustrated in FIG. 7.

FIG. 8 is a graph illustrating a compensation characteristics of FIGS. 2 and 7. The coordinate axes are similarly defined as in FIGS. 4 and 6. The solid line indicates the configuration illustrated in FIG. 2, and the dotted line indicates the configuration illustrated in FIG. 7. In FIG. 8, the left region (gray region) indicates a change with a transmission through the refractive index anisotropic layer 12g-1 of the polarization beam splitter side, and the right region indicates a change with a transmission through the refractive index anisotropic layer 12g-2. In the configuration of FIG. 7, particularly, the region of the refractive index anisotropic layer 12g-1 is in the non-compensation state, so that the polarization state does not converge to an ideal value.

It can be understood from FIG. 8 that the configuration where the compensation effect is different according to the arrangement of the refractive index anisotropic layers even with the same average value θave of the axial angles, particularly, the configuration of FIG. 7 is disadvantageous to the phase compensation in comparison to the configuration of FIG. 2. In other words, the axial angle of the refractive index anisotropic layer may be decreased as the distance increases from the polarization beam splitter in the z axis direction. The axial angle of the refractive index anisotropic layer farthest from the polarization beam splitter in the z axis direction may be smaller than the average value θave of the axial angles of the phase compensation plates.

This is the case of the two-layered configuration. The refractive index anisotropic layer may further laminated from the configuration of FIG. 7, and the thickness and the axial angle of each layer are appropriately selected, so that compensation into a desired polarization state can be available.

Figure 9:
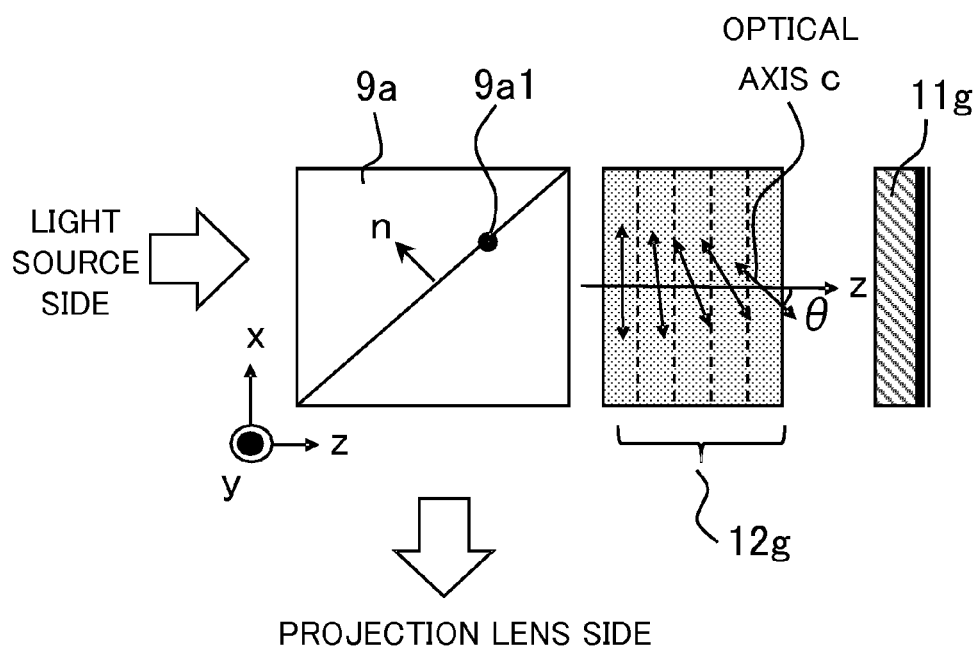
FIG. 9 is a schematic diagram illustrating a configuration of a variation of FIG. 2.

When three or more refractive index anisotropic layers are provided, the axial angle of each layer may be arranged, for example, so as to be monotonously changed (increased or decreased) as the distance increases from the polarization beam splitter instead of arranging the axial angle of each layer at random in the z axis direction. In addition to the use of a plurality of the phase compensation plates having uniform axial angle, for example, a liquid crystal material (film) having an out-of-plane alignment may be used for a refractive index anisotropic layer. FIG. 9 illustrates a configuration using the liquid crystal the phase compensation plate 12g. In FIG. 9, the liquid crystal whose optical axis gradually changes in the depth direction is set to the phase compensation plate 12g.

Since the liquid crystal has a continuous alignment angle and the axial angle continuously changes, the layers are not spatially separated from each other. Nevertheless, in a very narrow region, the liquid crystal layer can be treated as a refractive index anisotropic layer having the same average axial angle. The lamination structure thereof can be considered and treated as the structure made of a plurality of the refractive index anisotropic layers having different axial angles similarly to the above description.

When the phase compensation plate using the liquid crystal layer is used so as to compensate for the liquid crystal of the image display element, the axial direction and the thickness of the liquid crystal layer need to be adjusted according to the liquid crystal alignment azimuth of the image display element. Therefore, the liquid crystal layer may not commonly be used with the phase compensation plate of the embodiment, but needs to be separately arranged.

Figure 10:
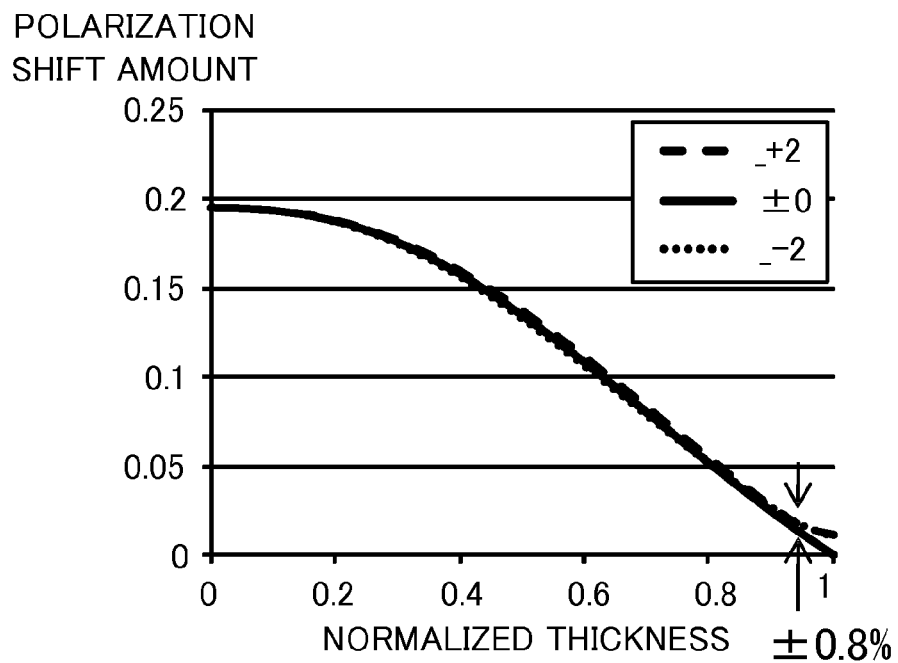
FIG. 10 is a graph corresponding to FIG. 4 in compensating the polarization state using a phase compensation plate illustrated in FIG. 9.

FIG. 10 illustrates changes in the compensation characteristic and the axial angular sensitivity in the configuration illustrated in FIG. 9. In FIG. 10, the polarization shift amount according to a change of the angle can be reduced down to half or less in comparison to FIG. 6, and by using a plurality of refractive index anisotropic layers having different axial angles like liquid crystal, the angular sensitivity can be further reduced.

When an organic material is used such as a liquid crystal film, there may be a problem of light resistance depending on collected light intensity, and particularly, that influence increases in the short wavelength side where the energy is high. Therefore, particularly, for an optical system having a plurality of the image display elements for each different wavelength band, it is used for at least one optical path of the green colored light optical path and the red colored light optical path, or for at least one location other than the optical path corresponding to the shortest wavelength is used. As a result, a high contrast and long-term reliability can be maintained.

In order to obtain the effect of this embodiment, a phase compensation plate including a plurality of refractive index anisotropic layers having different axial angles is necessary. Assume that θmax is a maximum value of the axial angle among the refractive index anisotropic layers and θmin is a minimum value thereof. Then, the following conditional expression may be satisfied with respect to the axial angle:

$$20° \leq \theta max - \theta min \leq 80° \quad (1)$$

Figure 5:
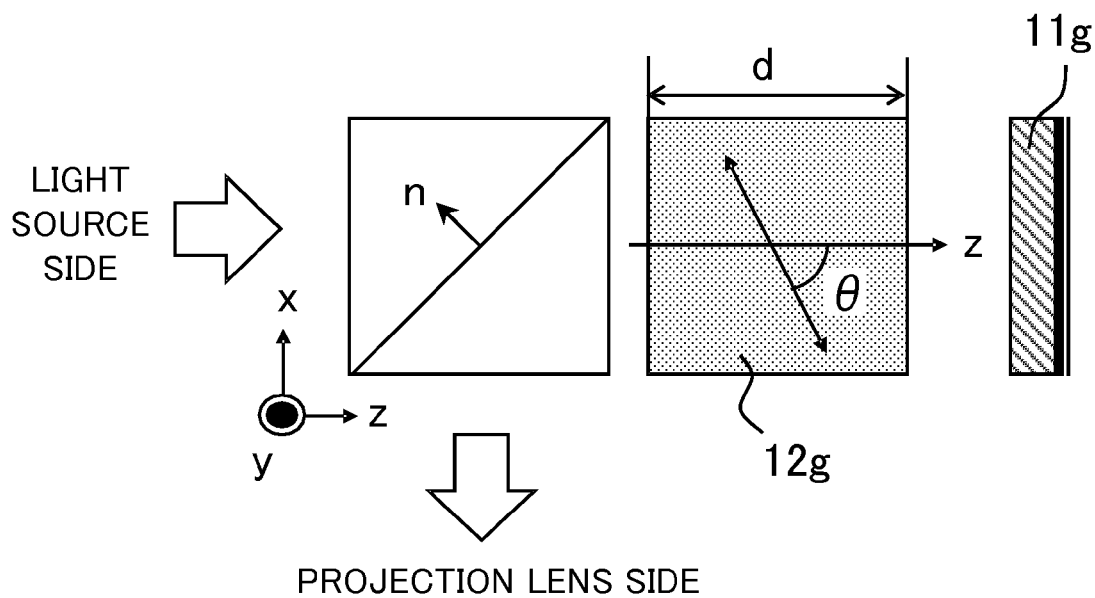
FIG. 5 is a schematic diagram illustrating a configuration according to a comparative example 1 corresponding to FIG. 2 of the phase compensation plate.

Unless the lower limit of the expression 1 is satisfied, the configuration becomes similar to the configuration of FIG. 5 having a single axial angle and the compensation effect can be obtained but it is difficult to obtain the effect of reducing the sensitivity of the axial angle. In addition, when the value exceeds the upper limit of the expression 1, the optical axis is aligned in the x axis direction or the z axis direction and the compensation effect obtained by inclining the optical axis is remarkably weakened.

The following conditional expression may be satisfied:

$$40° \leq \theta max - \theta min \leq 70° \quad (2)$$

If the axial angle becomes close to the plane normal, or approximately parallel to or perpendicular to the z axis direction, the asymmetrical polarization compensating effect cannot be obtained with respect to the incident angle and the incident azimuth of the polarization beam splitter, and thus the axial angle may incline relative to the z axis direction. The following conditional expression for the average value θave in the thickness direction of the axial angles θ may be satisfied:

$$40° \leq \theta ave \leq 70° \quad (3)$$

Herein, θave is an average value of the axial angles of the refractive index anisotropic layers in the thickness direction and is obtained by integrating the axial angle θ as a function θ(z) of the depth direction z and dividing the result by total thickness. If the thickness of each layer is the same, the axial angles θ may be averaged. When a change of the axial angle in the depth direction can be considered almost uniform in the refractive index anisotropic medium such as a liquid crystal layer, θave may be set to an average value of the axial angle (θmin and θmax) between the surface side and the substrate side of the liquid crystal layer.

The following conditional expression may be satisfied.

$$55° \leq \theta ave \leq 70° \quad (4)$$

The following conditional expression may be satisfied based on the two conditions of the axial angle expressed by the expressions (1) and (3).

$$65° \leq \theta max \leq 90° \quad (5)$$

$$10° \leq \theta min \leq 50° \quad (6)$$

From the description of FIGS. 7 and 8, the compensation effects thereof are different according to the arrangement order of the axial angles. Particularly, the axial angle may gradually decrease as the distance from the polarization beam splitter in the z direction increases. The axial angle of the refractive index anisotropic layer which is furthest away from the polarization beam splitter in the z direction among the refractive index anisotropic layers may be smaller than the average value θave of the axial angle. When these angular conditions are satisfied, the phase compensation effect and the effect of reducing the angular sensitivity can be simultaneously stably compromised.

Figure 11:
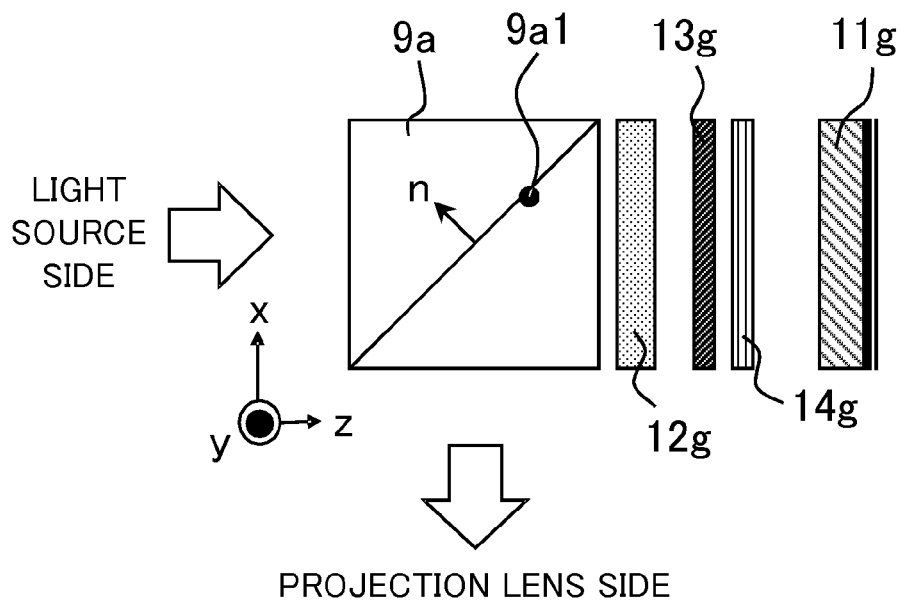
FIG. 11 is a schematic diagram illustrating a configuration of another variation of FIG. 2.

Another phase compensation plate may be added between the polarization beam splitter and the image display element. For example, when a vertical alignment (VA) type reflective liquid crystal is used as the image display element 11g, a second phase compensation plate 13g having an in-plane phase difference of λ/16 or more and λ/4 or less can be effectively used in order to compensate for pre-tilt in a black display state, as illustrated in FIG. 11. In this case, the second phase compensation plate 13g needs to be rotated about the z axis. However, if there is a small phase difference, the second phase compensation plate itself may serve as a phase compensation plate having an axial direction outside the plane. In order for the reflective liquid crystal itself to compensate for the incident/emitting characteristics, a third phase compensation plate 14g having a refractive index anisotropy opposite to the refractive index anisotropy of the reflective liquid crystal may be used. Due to the integration of the element with the polarization beam splitter or the integration of the phase compensation plates, unnecessary reflections can be eliminated and a ghost or deterioration of contrast can be suppressed.

Another phase compensation plate may be arranged between the light source and the polarization beam splitter or between the projection optical system and the polarization beam splitter. In this case, a polarizer may be arranged at the light source side or between the projection optical system and the polarization beam splitter and the above phase difference plate may be arranged between the polarizer and the polarization beam splitter. For example, in order to implement the stereo type three-dimensional display illustrated in FIG. 12, an optical system may be configured to combine a left eye image with a right eye image and to project the image using the polarization beam splitters.

Figure 12:
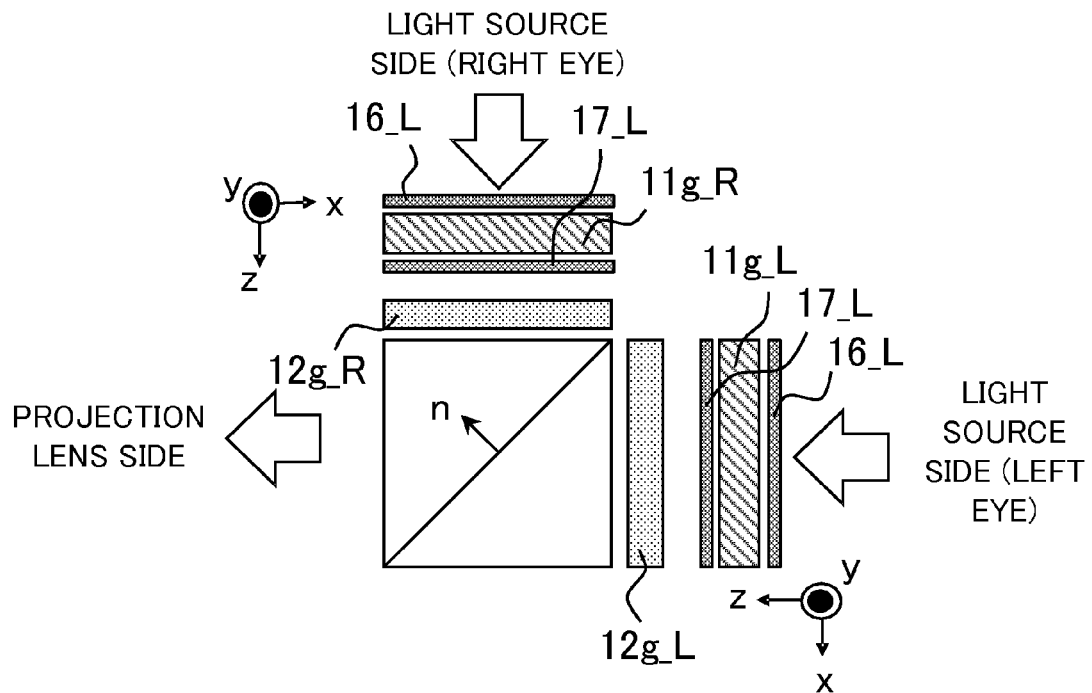
FIG. 12 is a schematic diagram illustrating a configuration of still another variation of FIG. 2.

FIG. 12 illustrates an illustrative configuration in which polarizers 16R, 17R and 16L, 17L are arranged before and after the transmission type liquid crystal 11g_R for right eye and the transmission type liquid crystal 11g_L for left eye, and the left eye image and the right eye image are combined by the polarization beam splitter. Thereby, a stereoscopic image is displayed. At this time, phase compensation plates 12g_R and 12g_L are arranged between the polarizers and the polarization beam splitters to compensate for a shift of the polarization axis between the polarizers and the polarization beam splitters.

Figure 13:
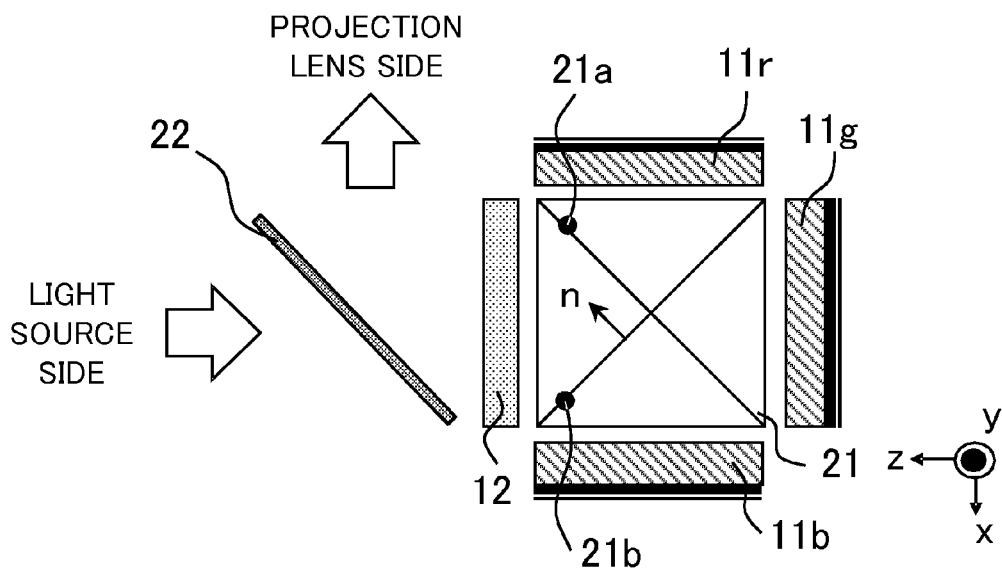
FIG. 13 is a schematic diagram illustrating a configuration of still another variation of FIG. 2.

This embodiment is effective to an optical system where a cross dichroic prism 21 having dichroic films 21a and 21b configured to reflect or transmit lights in different wavelength bands in different directions is arranged between the polarization beam splitter 22 and the image display element. For example, in the optical system illustrated in FIG. 13, the light from the light source is split into three colored lights as red, green, and blue colored lights by the cross dichroic prism 21 and illuminates the image display elements 11r, 11g, and 11b corresponding to the colored lights. The image light beams reflected by the image display elements 11r, 11g, and 11b are combined by the cross dichroic prism 21 again and guided to the polarization beam splitter side. In this case, an asymmetric phase difference occurs when the dichroic film obliquely transmits and reflects the light. Herein, the phase compensation plate 12 is arranged on the optical path between the dichroic film and the polarization beam splitter for phase compensations.

The polarization beam splitter may use a wire grid polarizer, a thin-film lamination polarization beam splitter, a refractive index anisotropic film lamination polarization beam splitter, or the like. Among them, a prism type thin-film lamination polarization beam splitter is effective to the high compensation effect.

First Embodiment

A projection display apparatus according to a first embodiment has the configurations illustrated in FIGS. 1 and 2, including two sapphire plates as phase compensation plates 12g, 12b, and 12r. Table 1 summarizes design values of each phase compensation plate. Each embodiment including this embodiment, light having a wavelength of 630 nm is used as Rch (red wavelength) light, light having a wavelength of 550 nm is used as Gch (green wavelength) light, and light having a wavelength of 450 nm is used as Bch (blue wavelength) light.

TABLE 1

| Gch | | d [um] | θ [deg] | θmax − θmin | θave | φ [deg] | n0/ne |
|---|---|---|---|---|---|---|---|
| PHASE COMPENSATING PLATE | POLARIZATION BEAM SPLITTER SIDE | 36.2 | 77 | 40 | 57 | 0 | 1.770/ 1.762 |
| | IMAGE DISPLAY ELEMENT SIDE | | 37 | | | 0 | |

| Rch | | d [um] | θ [deg] | θmax − θmin | θave | φ [deg] | n0/ne |
|---|---|---|---|---|---|---|---|
| PHASE COMPENSATING PLATE | POLARIZATION BEAM SPLITTER SIDE | 40.6 | 78 | 40 | 58 | 0 | 1.766/ 1.757 |
| | IMAGE DISPLAY ELEMENT SIDE | | 38 | | | 0 | |

| Bch | | d [um] | θ [deg] | θmax − θmin | θave | φ [deg] | n0/ne |
|---|---|---|---|---|---|---|---|
| PHASE COMPENSATING PLATE | POLARIZATION BEAM SPLITTER SIDE | 27.6 | 77 | 40 | 57 | 0 | 1.781/ 1.773 |
| | IMAGE DISPLAY ELEMENT SIDE | | 37 | | | 0 | |

Figure 14:
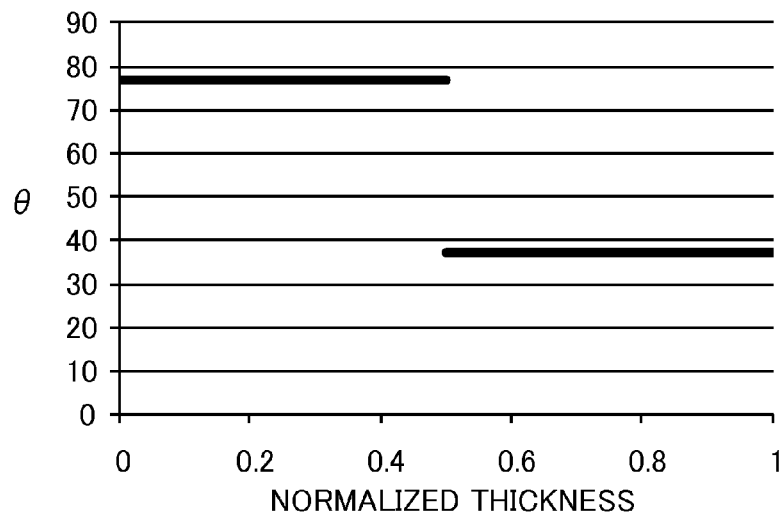
FIG. 14 is a graph illustrating an axial angle of a phase compensation plate according to a first embodiment of the present invention.

From Table 1, the optical axis of the phase compensation plate according to the first embodiment is located on the xz plane and satisfies the conditional expressions (1) to (6). FIG. 14 illustrates a graph illustrating the axial angles θ in the depth direction of the phase compensation plate 12g representing each optical path. The ordinate axis indicates an axial angle θ, and the abscissa axis indicates a normalized thickness. It can be understood from FIG. 14 that the axial angle of the refractive index anisotropic layer of the phase compensation plate according to the first embodiment includes an axial angle of 77° on the polarization beam splitter side and an axial angle of 37° on the image display element side for two layers.

Figure 15:
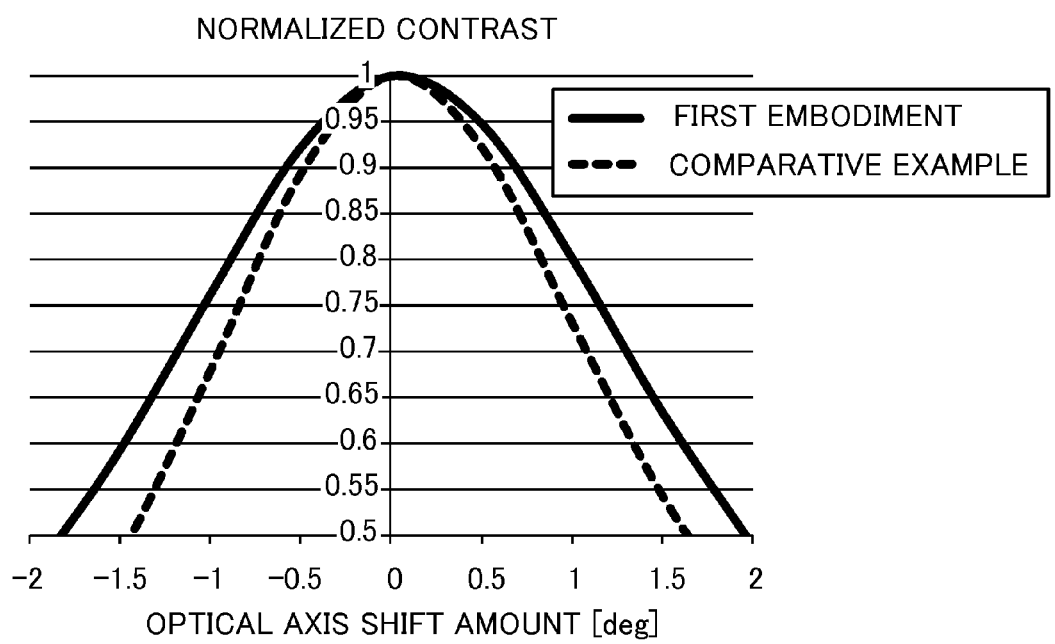
FIG. 15 is a graph illustrating an axial angular sensitivity of contrast of the phase compensation plate according to the first embodiment of the present invention.

FIG. 15 illustrates a contrast fluctuation according to the axial angle in the G optical path as a representative optical path. The ordinate axis indicates the contrast of the projection image and is normalized so that the contrast becomes 1 when the angle shift of an ideally set optical axis is zero. The abscissa axis indicates an optical axis angle shift amount (degree). The solid line indicates the characteristic of the first embodiment, and the dotted line indicates the characteristic of a comparative example where a phase is compensated with a single-layer sapphire plate (comparative example 1 illustrated in FIG. 5). It can be understood from FIG. 15 that a change in contrast according to the angle is suppressed in the first embodiment in comparison to the comparative example. In other words, in FIG. 15, with an angular shift of the optical axis of, for example, 1° due to the manufacturing error or installation error, the contrast of the projection image decreases by 25% in the comparative example. However, according to the first embodiment, the contrast decreases only by 15% and an excellent robustness is maintained.

The wavelengths are not limited to the wavelengths used in the embodiment. By using the red wavelength in a range of 600 nm to 670 nm, the green wavelength in a range of 500 nm to 580 nm, and the blue wavelength in a range of 430 nm to 480 nm, the effect of this embodiment can be obtained. This is also applied to the following embodiments.

Second Embodiment

A projection display apparatus according to a second embodiment has configurations illustrated in FIGS. 1 and 9, and each of phase compensation plates 12g, 12b, and 12r includes a liquid crystal layer of which the alignment gradually varies in the depth direction as a refractive index anisotropic layer. Table 2 summarizes design values of the phase compensation plates:

TABLE 2

| Gch | | d [um] | θ [deg] | θmax − θmin | θave | φ [deg] | n0/ne |
|---|---|---|---|---|---|---|---|
| PHASE COMPENSATING PLATE | POLARIZATION BEAM SPLITTER SIDE | 31.3 | 90 | 53 | 63.5 | 0 | 1.58/ 1.572 |
| | IMAGE DISPLAY ELEMENT SIDE | | 37 | | | 0 | |

| Rch | | d [um] | θ [deg] | θmax − θmin | θave | φ [deg] | n0/ne |
|---|---|---|---|---|---|---|---|
| PHASE COMPENSATING PLATE | POLARIZATION BEAM SPLITTER SIDE | 25.2 | 90 | 53 | 64 | 0 | 1.576/ 1.568 |
| | IMAGE DISPLAY ELEMENT SIDE | | 38 | | | 0 | |

TABLE 2-continued

| Bch | | d [um] | θ [deg] | θmax − θmin | θave | φ [deg] | n0/ne |
|---|---|---|---|---|---|---|---|
| PHASE COMPENSATING PLATE | POLARIZATION BEAM SPLITTER SIDE | 35.3 | 90 | 53 | 63.5 | 0 | 1.588/ 1.580 |
| | IMAGE DISPLAY ELEMENT SIDE | | 37 | | | 0 | |

Figure 16:
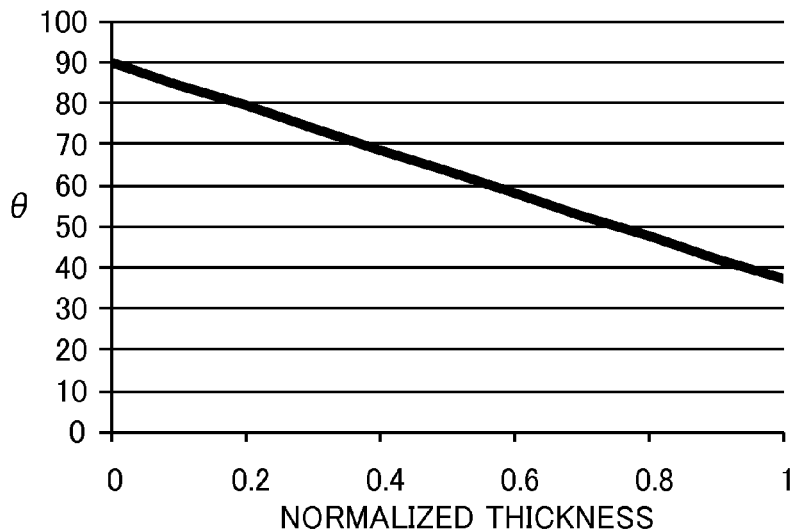
FIG. 16 is a graph illustrating an axial angle of a phase compensation plate according to a second embodiment of the present invention.

From Table 2, the optical axis of the phase compensation plate according to the second embodiment is located on the xz plane and satisfies the conditional expressions (1) to (6). FIG. 16 illustrates a graph illustrating the axial angles θ in the depth direction of the phase compensation plate 12g representing each optical path. The ordinate axis indicates an axial angle θ, and the abscissa axis indicates a normalized thickness. The axial angle of the phase compensation plate uniformly varies (decreased) from 90° on the polarization beam splitter side to 37° on the image display element side.

Figure 17:
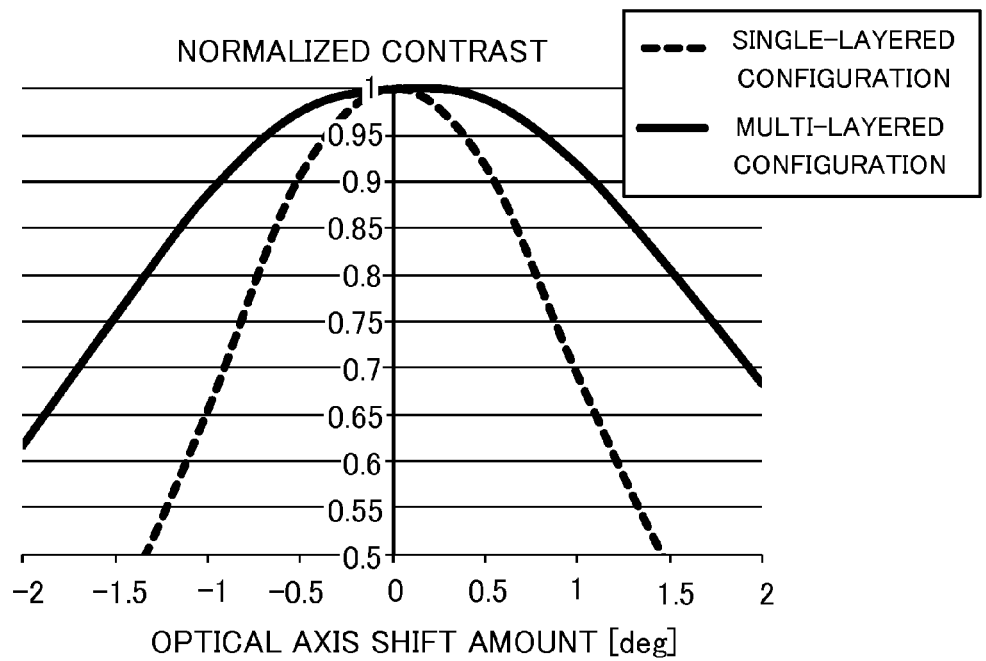
FIG. 17 is a graph illustrating an axial angular sensitivity of contrast of the phase compensation plate according to the second embodiment of the present invention.

FIG. 17 illustrates a contrast fluctuation according to the axial angle in the G optical path as a representative optical path. The ordinate axis indicates the contrast of the projection image and is normalized so that the contrast becomes 1 when the angle shift of an ideally set optical axis is zero. The abscissa axis indicates an optical axis angle shift amount (degree). The solid line indicates the characteristic of the second embodiment, and it can be understood that the angular sensitivity remarkably improves in comparison with the comparative example (comparative example 1 illustrated in FIG. 5). In other words, similarly to the first embodiment, the robustness has improved.

Third Embodiment

A projection display apparatus according to a third embodiment has configurations illustrated in FIGS. 1 and 11, and three liquid crystal layers of which the alignment directions of the refractive index anisotropy gradually varies in the depth direction are laminated as phase compensation plates 12g, 12b, and 12r. Second phase compensation plates 13g, 13b, and 13r and third phase compensation plates 14g, 14b, and 14r are arranged between the phase compensation plates 12g, 12b, and 12r and the image display elements 11g, 11b, and 11r. Table 3 summarizes design values of the phase compensation plates:

TABLE 3

| Gch | Gch | d [um] | θ [deg] | θmax − θmin | θave | φ [deg] | n0/ne |
|---|---|---|---|---|---|---|---|
| PHASE COMPENSATING PLATE | POLARIZATION BEAM SPLITTER SIDE | 12 | 20 | 70 | 55 | 0 | 1.555/ 1.567 |
| | IMAGE DISPLAY ELEMENT SIDE | | 90 | | | 0 | |
| PHASE COMPENSATING PLATE | POLARIZATION BEAM SPLITTER SIDE | 12 | 90 | 70 | 55 | 0 | 1.555/ 1.567 |
| | IMAGE DISPLAY ELEMENT SIDE | | 20 | | | 0 | |
| PHASE COMPENSATING PLATE | POLARIZATION BEAM SPLITTER SIDE | 12 | 90 | 70 | 55 | 0 | 1.555/ 1.567 |
| | IMAGE DISPLAY ELEMENT SIDE | | 20 | | | 0 | |
| SECOND PHASE COMPENSATING PLATE | | 9 | 90 | | | 90 | 1.517/ 1.522 |
| THIRD PHASE COMPENSATING PLATE | | 2.3 | 0 | | | 0 | 1.945/ 1.752 |

| Rch | Rch | d [um] | θ [deg] | θmax − θmin | θave | φ [deg] | n0/ne |
|---|---|---|---|---|---|---|---|
| PHASE COMPENSATING PLATE | POLARIZATION BEAM SPLITTER SIDE | 13 | 20 | 70 | 55 | 0 | 1.551/ 1.563 |
| | IMAGE DISPLAY ELEMENT SIDE | | 90 | | | 0 | |
| PHASE COMPENSATING PLATE | POLARIZATION BEAM SPLITTER SIDE | 13 | 90 | 70 | 55 | 0 | 1.551/ 1.563 |
| | IMAGE DISPLAY ELEMENT SIDE | | 20 | | | 0 | |
| PHASE COMPENSATING PLATE | POLARIZATION BEAM SPLITTER SIDE | 13 | 90 | 70 | 55 | 0 | 1.551/ 1.563 |
| | IMAGE DISPLAY ELEMENT SIDE | | 20 | | | 0 | |

TABLE 3-continued

| | | d [um] | θ [deg] | θmax − θmin | θave | φ [deg] | n0/ne |
|---|---|---|---|---|---|---|---|
| SECOND PHASE COMPENSATING PLATE | | 9 | 90 | | | 90 | 1.511/1.517 |
| THIRD PHASE COMPENSATING PLATE | | 2.3 | 0 | | | 0 | 1.913/1.737 |

| Bch | | d [um] | θ [deg] | θmax − θmin | θave | φ [deg] | n0/ne |
|---|---|---|---|---|---|---|---|
| PHASE COMPENSATING PLATE | POLARIZATION BEAM SPLITTER SIDE | 10 | 20 | 70 | 55 | 0 | 1.562/1.566 |
| | IMAGE DISPLAY ELEMENT SIDE | | 90 | | | 0 | |
| PHASE COMPENSATING PLATE | POLARIZATION BEAM SPLITTER SIDE | 10 | 90 | 70 | 55 | 0 | 1.562/1.566 |
| | IMAGE DISPLAY ELEMENT SIDE | | 20 | | | 0 | |
| PHASE COMPENSATING PLATE | POLARIZATION BEAM SPLITTER SIDE | 10 | 90 | 70 | 55 | 0 | 1.562/1.566 |
| | IMAGE DISPLAY ELEMENT SIDE | | 20 | | | 0 | |
| SECOND PHASE COMPENSATING PLATE | | 9 | 90 | | | 90 | 1.526/1.532 |
| THIRD PHASE COMPENSATING PLATE | | 2.3 | 0 | | | 0 | 2.023/1.786 |

Figure 18:
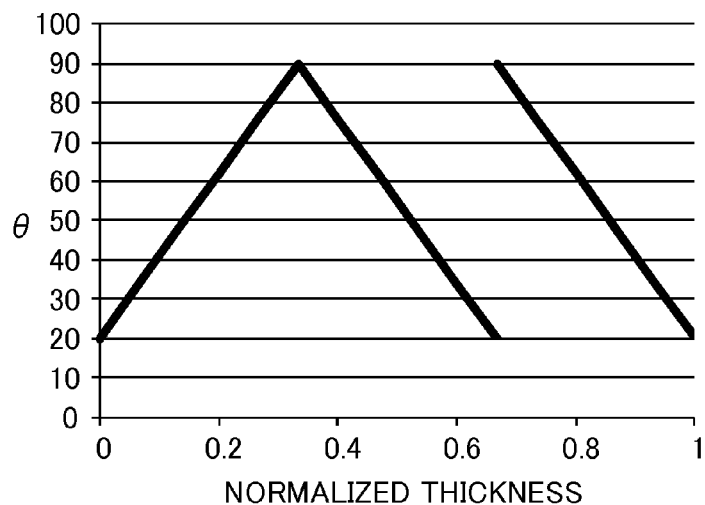
FIG. 18 is a graph illustrating an axial angle of a phase compensation plate according to a third embodiment of the present invention.

From Table 3, the optical axis of the phase compensation plate according to the third embodiment is located on the xz plane and satisfies the conditional expressions (1) to (6). FIG. 18 illustrates a graph illustrating the axial angles θ in the depth direction of the phase compensation plate 12g representing each optical path. The ordinate axis indicates an axial angle θ, and the abscissa axis indicates a normalized thickness. In the three-layered configuration of the refractive index anisotropic layers, the axial angle of the phase compensation plate uniformly varies from 90° of the polarization beam splitter side to 20° of the image display element side. The alignment directions of the three liquid crystal layers are not the same, but the alignment direction of the liquid crystal layer closest to the polarization beam splitter side is opposite to the alignment directions of the other two liquid crystal layers.

Figure 19:
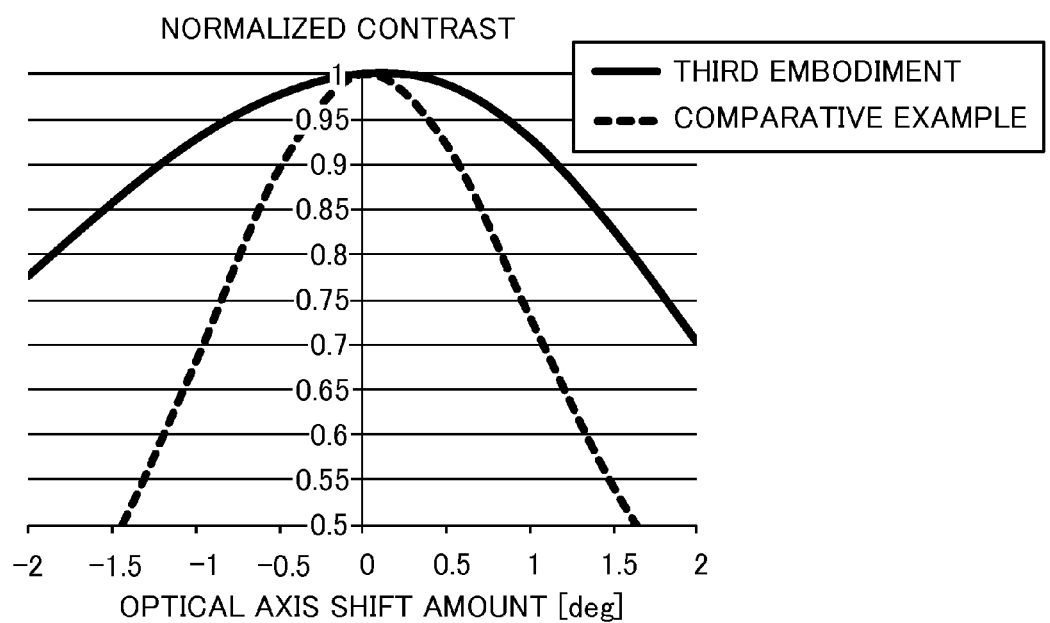
FIG. 19 is a graph illustrating an axial angular sensitivity of contrast of the phase compensation plate according to the third embodiment of the present invention.

FIG. 19 illustrates the contrast change according to the axial angle in the G optical path as a representative optical path. The ordinate axis indicates contrast of the projection image and is normalized so that the contrast becomes 1 when the angle shift of an ideally set optical axis is zero. The abscissa axis indicates an optical axis angle shift amount (degree). The solid line indicates the characteristic of the third embodiment, and it can be understood that the angular sensitivity remarkably improves in comparison with the comparative example (comparative example 1 illustrated in FIG. 5). In other words, similarly to the first embodiment, the robustness has improved. In the configuration where the axial angle is not continuous, the effect of the present invention can be obtained.

The projection display apparatus can be applied to a liquid crystal projector.

The present invention can provide a projection display apparatus configured to stably improving contrast of a projection image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-219185, filed Oct. 1, 2012 which is hereby incorporated by reference herein in its entirety.

What is claimed is:

1. A projection display apparatus configured to project an image onto a target surface, the projection display apparatus comprising:
a polarization beam splitter having a polarization splitting plane configured to transmit first polarized light of incident light and to reflect second polarized light of the incident light which has a polarization direction perpendicular to that of the first polarized light;
a first phase compensation plate including two layers and configured to provide a retardance which is larger than a sum of $\lambda/4$ to polarized light having a wavelength $\lambda$ from the polarization beam splitter; and
a light modulator configured to modulate light from the first phase compensation plate according to an image signal,
wherein when a z axis is set to a normal direction of an incident plane of the light modulator, a y axis is set to a direction perpendicular to the z axis and a normal of the polarization splitting plane, an x axis is set to a direction perpendicular to the z axis and the y axis, and an axial angle is defined as an angle of 90° or less between each of optical axis of two layers of the first phase compensation plates and the z axis, each layer has a constant axial angle, and the optical axis of each layer inclines with respect to the x axis in an xz plane,
wherein the axial angle of the layer closer to the polarization beam splitter among the two layers is larger than the axial angle of the layer farther from the polarization beam splitter,
wherein the following conditional expression is satisfied, $$20° \leq \theta_{max} - \theta_{min} \leq 80°$$

where θmax is a maximum value of the axial angle and θmin is a minimum value of the axial angle, wherein the following conditional expression is satisfied, 40°≤θave≤70° where θave is an average value of axial angles of the two layers.

2. A projection display apparatus configured to project an image onto a target surface, the projection display apparatus comprising:
   a polarization beam splitter having a polarization splitting plane configured to transmit first polarized light of incident light and to reflect second polarized light of the incident light which has a polarization direction perpendicular to that of the first polarized light;
   a first phase compensation plate including three layers or more and configured to provide a retardance which is larger than a sum of λ/4 to polarized light having a wavelength λ from the polarization beam splitter; and
   a light modulator configured to modulate light from the first phase compensation plate according to an image signal,
   wherein when a z axis is set to a normal direction of an incident plane of the light modulator, a y axis is set to a direction perpendicular to the z axis and a normal of the polarization splitting plane, an x axis is set to a direction perpendicular to the z axis and the y axis, and an axial angle is defined as an angle of 90° or less between each of optical axis of two layers of the first phase compensation plates and the z axis, each layer has a constant axial angle, and the optical axis of each layer inclines with respect to the x axis in an xz plane, the three layers or more containing different axial angles,
   wherein the following conditional expression is satisfied, 20°≤θmax−θmin≤80° where θmax is a maximum value of the axial angle and θmin is a minimum value of the axial angle, wherein the following conditional expression is satisfied, 40°≤θave≤70° where θave is an average value of axial angles of the three layers or more.

3. The projection display apparatus according to claim 2, wherein the following conditional expression is further satisfied:

40°≤θmax−θmin≤70°.

4. The projection display apparatus according to claim 2, wherein the following conditional expression is further satisfied:

55°≤θave≤70°.

5. The projection display apparatus according to claim 2, wherein the following conditional expression is further satisfied:

65°≤θmax≤90°.

6. The projection display apparatus according to claim 2, wherein the following conditional expression is further satisfied:

10°≤θmin≤50°.

7. The projection display apparatus according to claim 2, wherein the axial angles of the three or more layers are configured so as to monotonously increase or decrease as a distance from the polarization beam splitter increases in the z axis.

8. The projection display apparatus according to claim 2, wherein the first phase compensation plate is made of a liquid crystal material.

9. The projection display apparatus according to claim 2, further comprising a plurality of image display elements each configured to modulate and reflect the incident light and to correspond to the incident light in different wavelength bands,
   wherein the first phase compensation plate is arranged between at least one of the plurality of image display elements and the polarization beam splitter.

10. The projection display apparatus according to claim 9, wherein the first phase compensation plate is arranged on an optical path of green colored light.

11. The projection display apparatus according to claim 2, further comprising:
   a plurality of image display elements configured to modulate and reflect the incident light and to correspond to the incident light in different wavelength bands; and
   a second phase compensation plate arranged between the polarization beam splitter and at least one of the plurality of image display elements, and provided with a retardance of λ/16 or more and λ/4 or less with respect to light having a wavelength λ.

12. The projection display apparatus according to claim 11, further comprising:
   a plurality of image display elements configured to modulate and reflect the incident light and to correspond to the incident light in different wavelength bands; and
   a third phase compensation plate arranged between the polarization beam splitter and at least one of the plurality of image display elements and provided with a refractive index anisotropy opposite to refractive index anisotropy of the image display element.

13. The projection display apparatus according to claim 2, wherein the polarization beam splitter is a prism type polarization beam splitter.

14. The projection display apparatus according to claim 2, further comprising a polarizer configured to transmit the first polarized light and to reflect the second polarized light,
   wherein the first phase compensation plate is arranged between the polarizer and the polarization beam splitter.

15. The projection display apparatus according to claim 2, further comprising a projection optical system configured to project the image onto the target surface,
   wherein the phase compensation plate is arranged on an optical path between the polarization beam splitter and the projection optical system.

16. The projection display apparatus according to claim 2, further comprising a projection optical system configured to project the image onto the target surface,
   wherein the phase compensation plate is arranged on a light source side of the polarization beam splitter.

17. A projection display apparatus configured to project an image onto a target surface, the projection display apparatus comprising:
   a polarization beam splitter having a polarization splitting plane configured to transmit first polarized light of incident light and to reflect second polarized light which has a polarization direction perpendicular to that of the first polarized light;
   a dichroic film configured to reflect or to transmit light beams in different wavelength bands;
   a first phase compensation plate including two layers and configured to provide a retardance which is larger than a sum of λ/4 to polarized light having a wavelength λ of the polarization beam splitter; and a light modulator configured to modulate light from the first phase compensation plate according to an image signal, wherein when a z axis is set to a normal direction of an incident plane of the light modulator, a y axis is set to a direction perpendicular to the z axis and a normal of the polarization splitting plane, an x axis is set to a direction perpendicular to the z axis and the y axis, and an axial angle is defined as an angle of 90° or less between each of optical axis of two layers of the first phase compensation plates and the z axis, each layer has a constant axial angle, and the optical axis of each layer inclines with respect to the x axis in an xz plane, wherein the axial angle of the layer closer to the polarization beam splitter among the two layers is larger than the axial angle of the layer farther from the polarization beam splitter, wherein the following conditional expression is satisfied, $$20° \leq \theta max - \theta min \leq 80°$$

where $\theta max$ is a maximum value of the axial angle and $\theta min$ is a minimum value of the axial angle, wherein the following conditional expression is satisfied, $$40° \leq \theta ave \leq 70°$$

where $\theta ave$ is an average value of axial angles of the two layers.

18. A projection display apparatus configured to project an image onto a target surface, the projection display apparatus comprising:
 a polarization beam splitter having a polarization splitting plane configured to transmit first polarized light of incident light and to reflect second polarized light which has a polarization direction perpendicular to that of the first polarized light;
 a dichroic film configured to reflect or to transmit light beams in different wavelength bands;
 a first phase compensation plate including three layers or more and configured to provide a retardance which is larger than a sum of $\lambda/4$ to polarized light having a wavelength $\lambda$ from the polarization beam splitter; and
 a light modulator configured to modulate light from the first phase compensation plate according to an image signal,
 wherein when a z axis is set to a normal direction of an incident plane of the light modulator, a y axis is set to a direction perpendicular to the z axis and a normal of the polarization splitting plane, an x axis is set to a direction perpendicular to the z axis and the y axis, and an axial angle is defined as an angle of 90° or less between each of optical axis of two layers of the first phase compensation plates and the z axis, each layer has a constant axial angle, and the optical axis of each layer inclines with respect to the x axis in an xz plane, the three layers or more containing different axial angles,
 wherein the following conditional expression is satisfied, $$20° \leq \theta max - \theta min \leq 80°$$

where $\theta max$ is a maximum value of the axial angle and $\theta min$ is a minimum value of the axial angle, wherein the following conditional expression is satisfied, $$40° \leq \theta ave \leq 70°$$

where $\theta ave$ is an average value of axial angles of the three layers or more.

19. The projection display apparatus according to claim 18, wherein the phase compensation plate is arranged between the dichroic film and the polarization beam splitter.

20. The projection display apparatus according to claim 18, further comprising a plurality of image display elements each configured to modulate and reflect the incident light and to correspond to the incident light in different wavelength bands,
 wherein the phase compensation plate is arranged between the dichroic film and at least one of the plurality of image display elements.

\* \* \* \* \*